(12) United States Patent
Han et al.

(10) Patent No.: US 6,503,471 B1
(45) Date of Patent: Jan. 7, 2003

(54) PROCESS FOR MALODOROUS GAS TREATMENT

(75) Inventors: Seong-Hwan Han, Seoul (KR); Kwang-Deog Jung, Seoul (KR); Oh-Shim Joo, Seoul (KR); Seong-Hoon Cho, Seoul (KR); Jun-Woo Oh, Seoul (KR)

(73) Assignee: Korea Institute of Science & Technology (KR)

( * ) Notice: Subject to any disclaimer, the term of this patent is extended or adjusted under 35 U.S.C. 154(b) by 2 days.

(21) Appl. No.: 09/684,316

(22) Filed: Oct. 6, 2000

Related U.S. Application Data

(63) Continuation-in-part of application No. 09/518,162, filed on Feb. 17, 2000, which is a continuation-in-part of application No. 09/029,620, filed as application No. PCT/KR96/00149 on Aug. 28, 1996, now abandoned.

(30) Foreign Application Priority Data

Aug. 29, 1995 (KR) .............................. 95-27099
Oct. 6, 1999 (KR) .............................. 99-43008

(51) Int. Cl.$^7$ ............................................. B01D 53/78
(52) U.S. Cl. ................. 423/210; 423/220; 423/224; 423/235; 423/238; 423/243.01; 423/243.02; 423/243.03; 423/243.07; 423/243.08; 423/245.2
(58) Field of Search ................. 423/210, 235, 423/243.01, 243.02, 243.03, 243.07, 243.08, 245.2, 576.4, 576.5, 576.6, 220, 224, 238; 204/157.15, 158.2

(56) References Cited

U.S. PATENT DOCUMENTS

| | | | | |
|---|---|---|---|---|
| 3,965,249 A | * | 6/1976 | Kinosz ..................... | 423/497 |
| 4,297,333 A | * | 10/1981 | Crawford .................. | 423/241 |
| 4,400,304 A | * | 8/1983 | Clark ........................ | 252/430 |
| 4,595,577 A | * | 6/1986 | Stas et al. ................. | 423/245 |
| 4,892,718 A | * | 1/1990 | Peter et al. ................ | 423/235 |
| 6,165,327 A | * | 12/2000 | Pappa et al. ............. | 204/158.2 |

FOREIGN PATENT DOCUMENTS

| | | | | |
|---|---|---|---|---|
| EP | 0 082 915 B1 | * | 7/1985 | ............. C01B/7/01 |
| EP | 0211530 A2 | * | 2/1987 | |
| EP | 0276044 A2 | * | 7/1988 | |
| JP | 55-61920 A | * | 5/1980 | ............. 423/243.03 |
| JP | 56-31424 A | * | 3/1981 | ............. B01D/53/34 |
| JP | 62132592 A | * | 6/1987 | |
| JP | 62176595 A | * | 8/1987 | ............. 204/157.15 |

OTHER PUBLICATIONS

Kohl Et Al. Gas Purification (4th ed.), Gulf Publishing Co., Houston TX USA, pp. 515–516; ISBN 0–87201–314–6, (1985).*

Grant Et Al. Grant and Hackh's Chemical Dictionary (5th ed.), McGraw–Hill Book Co, USA, p. 364; ISBN 0–07–024067–1 (1987).*

* cited by examiner

Primary Examiner—Stanley S. Silverman
Assistant Examiner—Timothy C Vanoy
(74) Attorney, Agent, or Firm—Anderson Kill & Olick, P.C.

(57) ABSTRACT

Malodorous gases such as amines, organosulfur compounds, hydrogen sulfide, styrene and aldehydes are economically and efficiently treated at ambient temperature and pressure by a catalytic absorption and oxidation process comprising: (a) bringing the malodorous gases into contact with a scrubbing water containing a heterogeneous catalyst to absorb the malodorous components catalytically, and (b) subjecting the resulting solution containing the malodorous components to a catalytic oxidation by contacting it with an oxidizing agent such as hydrogen peroxide, ozone, oxygen, air, nitrogen oxides, and NaOCl in the presence of the catalyst at a temperature ranging from 0 to 100 □ under an ambient pressure, the heterogeneous catalyst comprising an active metal element selected from alkali, alkaline earth and transition metals, and an oxide support material.

12 Claims, 2 Drawing Sheets

PROCESS FOR MALODOROUS GAS TREATMENT

CROSS REFERENCE TO RELATED APPLICATION

This application is a continuation-in-part application of U.S. Ser. No. 09/518,162 filed on Feb. 17, 2000, which is a continuation-in-part application of U.S. Ser. No. 09/029,620 filed on Feb. 27, 1998 and now abandoned, and claims priorities thereon pursuant to 35 USC 120 and is a 371 of PCT/KR96/00149, filed Aug. 28, 1996.

FIELD OF THE INVENTION

The present invention relates to malodorous gas treatment; more particularly, to a method for the removal of malodorous compounds from atmosphere by use of a catalytic-absorption and oxidation process under a mild condition.

BACKGROUND OF THE INVENTION

Various malodorous compounds are generated at many industrial plants, sewage collection systems, wastewater treatment facilities, garbage incineration plants and reclaimed landfill sites. Because these malodorous compounds cause air pollution problem, particularly in a closed working space, many efforts have been made to develop an efficient process to remove them.

The removal of the malodorous compounds from atmosphere has been conducted by adsorption, water-absorption, biological treatment and combustion processes. The combustion process may be applied to malodorous compounds present in a large amount and at a high concentration, but it requires a high cost. Further, the adsorption process using an adsorbent provides a significant effect in the treatment of fatty acids, mercaptans, aliphatic or aromatic hydrocarbons and organic chlorinated compounds, but it is less effective in the treatment of major malodorous compounds having low adsorptivity such as hydrogen sulfide, chlorine, formaldehyde and ammonia. Furthermore, the biological treatment with microorganisms has a low efficiency.

On the other hand, the water-absorption process generates a large amount of wastewater, thus requiring an additional treatment process. To deal with such a secondary pollution problem, JP 56-31424 suggests a method for the treatment of malodor, particularly chloric odor, which comprises bringing the malodorous gas into contact with an alkaline cleaning liquid of pH 10 to 13 and then with a cleaning liquid maintained at a pH of 6 to 8 by use of sodium hypochlorite and an acid. This process, however, is not suitably applicable to a variety of other malodorous wastewater streams.

Further, U.S. Pat. No. 5,948,269 issued on Sep. 7, 1999 discloses a process for the removal of dissolved hydrogen sulfide and other malodorous compounds in a liquid or sludge wastewater. This process is characterized by adding an alkaline iron product such as ferrous hydroxide, ferrous carbonate, ferrous bicarbonate, hydrated ferrous oxide and ferric hydroxide. This method still has the problem of an expensive ligand to stabilize Fe ions in solution and generating toxic wastewater containing large amounts of nitrogen and, moreover, and the pH control of the solution is a crucial part of this process, which is a drawback of the system.

The present inventors has attempted to develop a catalytic absorption and catalytic oxidation process effective for the treatment of malodorous gas, and found that specific catalysts can be beneficially used for the treatment of malodorous gas dissolved in wastewater.

SUMMARY OF THE INVENTION

It is, therefore, a primary object of the invention to provide a catalytic deodorization process useful for treating malodorous gases.

In accordance with an aspect of the present invention, there is provided a process for treating malodorous gases, which comprises: (a) bringing the malodorous gases into contact with a scrubbing water containing a catalyst to absorb the malodorous components catalytically, and (b) subjecting the resulting solution containing the malodorous compounds to a catalytic oxidation by contacting it with an oxidizing agent in the presence of the catalyst at a temperature ranging from 0 to 100° C. under an ambient pressure, the catalyst comprising an active metallic element selected from alkali, alkaline earth and transition metals, and an optional oxide support material.

BRIEF DESCRIPTION OF DRAWING

The above and other objects and features of the present invention will become apparent from the following description, taken in conjunction with the accompanying drawing, wherein.

DETAILED DESCRIPTION OF THE INVENTION

Figure 1:
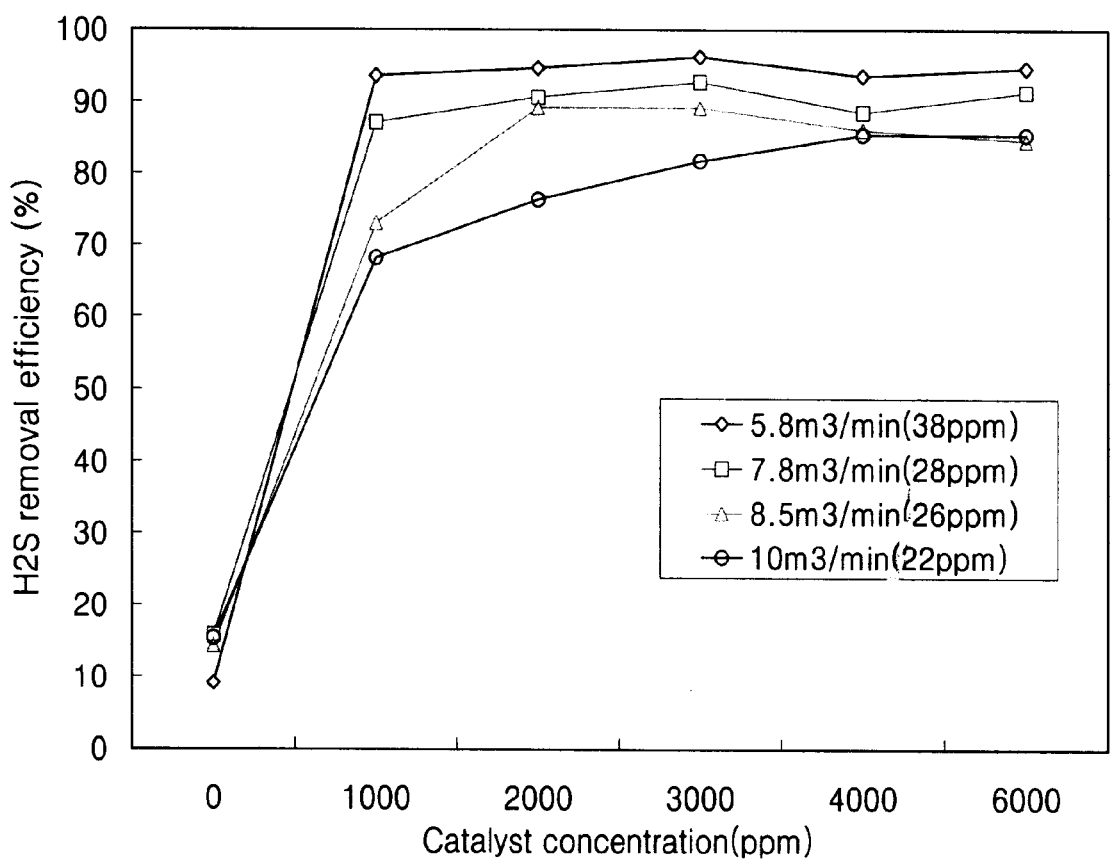
FIGS. 1 and 2 show the removal efficiency of hydrogen sulfide as malodorous gases containing hydrogen sulfide were treated with the inventive catalytic-absorption and oxidation process.

In accordance with the present invention, malodorous gases can be treated economically and efficiently by a catalytic absorption and oxidation process in the presence of a specified catalyst under a mild condition.

The inventive process is suitable for treating various malodorous gases including amines such as $NH_3$ and $(CH_3)_3N$, organosulfur compounds such as methyl mercaptan ($CH_3SH$), dimethyl sulfide (($CH_3)_2S$) and dimethyl difulfide (($CH_3)_2S_2$), hydrogen sulfide ($H_2S$), styrene($C_8H_8$), acetaldehyde($CH_3CHO$) and others.

Since most of the malodorous gases have high solubility in water, in the inventive process, the malodorous gases are brought into contact with a scrubbing water to provide a solution containing the malodorous components. In the inventive process, the dispersion of a specified catalyst according to the present invention in the scrubbing water drastically accelerate the absorption rate and improve the overall deodorization efficiency. The absorptive scrubbing may be conducted in a conventional manner, e.g., by spraying a water stream circulated from a water tower into the area of malodorous gases. At this time, the catalyst to be used in the subsequent catalytic oxidation process is introduced into the scrubbing water stream to improve absorption rate.

Subsequently, the solution generated by the water scrubbing process contacts with an oxidizing agent in the presence of the catalyst according to the present invention.

Representatives of the oxidizing agent, which may be used in the present invention, include hydrogen peroxide, ozone, oxygen, air, $N_xO_y$ (x=1~3, y=1~4), NaOCl and a combination thereof with optional light irradiation, among which air and oxygen are preferred.

In the catalytic absorption and oxidation of the present invention, a heterogeneous or homogeneous catalyst may be employed.

The inventive heterogeneous catalyst comprises an active metallic element and a support material. The support material may be an oxide of a metal selected from Al, Ga, In, Si, Ge, Sn, Pb, As, Sb, Bi, Se, Zn, Cd, Fe, Mn, Cr, Mo, W, V, Nb, Ti, Zr, Hf, Ta, Mg, Ca, Sr, Ba, a Lanthanoid element, an Actinoid element or a mixture thereof. Preferably, the support is CaO, BaO, MnO, iron oxide, $TiO_2$, $SnO_2$, MgO, or $PbO_2$.

The active metallic element suitable for use in preparing the inventive heterogeneous catalyst may be an alkali metal, alkaline earth metal and transition metal. Preferred are Group IA elements such as Li, Na and K, Group VIII elements such as Ru, Co, Fe, Pt, Pd, Ni, Co and Rh, Group VII elements such as Mn, Group IB elements such as Cu, and a mixture thereof; and more preferred are Ru, Co, Fe, Cu, Mn, Ni and a mixture thereof.

The preferred heterogeneous catalyst is a transition metal catalyst supported on MgO or $PbO_2$.

The heterogeneous catalyst of the present invention may be prepared by impregnating a support material with an aqueous or organic solution containing a soluble form of metallic element, e.g., a chloride, nitrate or sulfate, in an amount ranging from 0.0001 to 100% by weight; more preferably 0.01 to 50% by weight; and most preferably 0.1 to 10% by weight, based on the amount of the support material used; drying and calcining the impregnated support material at a temperature ranging from 200 to 600° C., preferably about 400° C. for a period ranging from 0.1 to 24 hours, preferably 2 to 4 hours. Alternatively, the metallic element may be impregnated on the support material using a gas containing the vapor of an organometallic compound under a reduced pressure in a conventional manner. The resultant catalyst may be in the form of powders, pellets or granules.

In accordance with the present invention, the heterogeneous catalyst may further comprise a third element which is capable of altering the electrochemical property of the support material. Such an element may be an alkali metal or an alkaline earth metal, which is different from the active metallic element, P, B, F, As, Ga or Ge, or a mixture thereof. The third element may be employed in an amount ranging from 0.0001 to 90% by weight; more preferably 0.01 to 20% by weight; and most preferably 0.1 to 5% by weight, based on the weight of the catalyst.

On the other hand, in case a homogeneous catalyst, e.g., solubilized $Fe(NO_3)_2$, is used, it may be added, without support material, in an amount ranging from about 10 ppm to about 5% by weight, preferably 100 ppm to 1% by weight and more preferably 1,000 ppm to 5,000 ppm.

The efficiency of the catalyst of the present invention is enhanced when the catalytic system is irradiated, e.g., with sun light or UV light. Further, a complexing agent such as ethylenediamine tetraacetic acid (EDTA) may be introduced to enhance the stability and the reactivity of the catalyst.

In accordance with the present invention, a reducing agent may be optionally employed, together with the catalyst, for the purpose of assisting the oxidation-reduction reaction of the active metallic element of the catalyst. The reducing agent functions to provide an active oxygen by a partial reduction of the metallic element supported on the support material. Water-soluble reducing agents may be suitably used, and representatives of them include ascorbic acid, hydroquinone, formaline, methanol, trialkyl orthoesters and acetals.

Further, the catalytic system of the present invention may employ a radical transferring agent in order for more effective use of oxygen radicals generated by the oxidation. Suitable examples of the radical transferring agent are $Br_2$, $Br^-$, $BrO^-$ and $BrO_3^-$.

In case the heterogeneous catalyst is used, the catalytic reaction system may be practiced using a known reactor system, e.g., a fixed bed reactor, a fluidized bed reactor, a slurry reactor and others. If necessary, the used catalyst may be recovered from the reactor, regenerated by drying and calcination, and recycled.

Since the active ingredient of the catalyst may be leached out at a strongly acidic condition, the pH of the system may preferably be adjusted to 3 or higher, more preferably to 6 or higher. Further, the treatment of hydrogen sulfide is preferably conducted under a basic condition because hydrogen sulfide is acidic.

The inventive catalytic absorption and oxidation of malodorous gases can be conducted effectively at ambient temperature and pressure, although it may be carried out more effectively at a higher temperature as it allows. The inventive process may be preferably conducted at a temperature ranging from 0 to 100° C.

The treatment of malodorous gases according to the inventive process has advantages in that no malodorous components remains in the reaction product stream; it is possible to completely remove hydrogen sulfides by catalytic absorption and oxidation which are difficult to treat completely by a simple adsorption process; and the treatment can be preformed at a larger scale than a combustion method.

The following Examples are given for the purpose of illustration only and are not intended to limit the scope of the invention.

Preparation 1: Preparation of Catalysts

A Fe/MgO catalyst was prepared by dissolving 100 g of $FeSO_4$ in 1 L of water, impregnating 1 kg of MgO (325 mesh) with the resulting solution, drying the resulting material completely at room temperature and calcining the dried material at 400° C. for 3 hours to obtain a catalyst having a Fe loading of 1 wt % based on the total weight of the catalyst.

A similar procedure was repeated using other metal chlorides, nitrates or sulfates together with appropriate metal oxide supports to prepare $Cu/TiO_2$, Mn/MgO, Cr/MgO, Ni/MgO, Pb/MgO, $Fe/TiO_2$, $Ru/PbO_2$ and Pd/MgO catalysts, respectively.

Preparation 2: Preparation of Catalysts

A Fe/MgO catalyst was prepared by mixing 121 g of $Fe_3(CO)_{12}$ with 1 kg of MgO (325 mesh), heating the resulting mixture to 100° C. or below under a reducing atmosphere to prevent the iron compound from undergoing oxidation, and calcining the resulting material at 400° C. for 3 hours to obtain a catalyst having a Fe loading of 1 wt % based on the total weight of the catalyst.

Preparation 3: Preparation of Catalyst

A Fe/P/MgO catalyst was prepared by impregnating 1 kg of MgO (325 mesh) with a solution obtained by dissolving 20 g of $P_2O_5$ in 1 L of water, and repeating the procedure of Preparation 1 using the resulting phosphor-containing MgO support, to obtain a catalyst having a Fe loading of 1 wt % and a P loading of 3 wt % based on the total weight of the catalyst.

A similar procedure was repeated using other metal chlorides, nitrates or sulfates together with appropriate Li compounds to prepare Co/Li/MgO and Fe/Li/MgO catalysts, respectively.

EXAMPLE 1
Treatment of Organic Sulfur Compounds

Dimethyl sulfide and dimethyl disulfide were mixed with air to prepare a standard malodorous gas, which was subsequently treated with water containing a Fe/P/MgO catalyst prepared in Preparation 3 through a water scrubbing process, to dissolve it into the water.

In a fluidized bed reactor, the solution containing the sulfide components was treated with oxygen at room temperature and 1 atm for 30 minutes in the presence of the Fe/P/MgO catalyst.

The contents of each malodorous component in the solution before and after the treatment were determined by a gas chromatography and the results are shown in Table 1.

TABLE 1

| Component | Before the treatment | After the treatment |
|---|---|---|
| Dimethyl sulfide (mg/L) | 480 | 144 |
| Dimethyl disulfide (mg/L) | 172 | 34 |

EXAMPLE 2
Treatment with Various Catalysts

The procedure described in Example 1 was repeated using other various catalysts prepared in Preparations.

The COD values and the contents of the sulfur-containing compounds were measured before and after the treatment, and the results are shown in Table 2.

TABLE 2

| Catalyst | Item | Before treatment | After treatment |
|---|---|---|---|
| Fe/P/MgO | $COD_{Cr}$(mg/L) | 375 | 65 |
| | Dimethyl sulfide (mg/L) | 130 | 41 |
| | Dimethyl disulfide (mg/L) | 95 | 17 |
| $Cu/TiO_2$ | $COD_{Cr}$(mg/L) | 408 | 201 |
| | Dimethyl sulfide (mg/L) | 194 | 68 |
| | Dimethyl disulfide (mg/L) | 153 | 41 |
| $Ru/PbO_2$ | $COD_{Cr}$(mg/L) | 532 | 127 |
| | Dimethyl sulfide (mg/L) | 148 | 42 |
| | Dimethyl disulfide (mg/L) | 102 | 18 |
| Mn/MgO | $COD_{Cr}$(mg/L) | 1023 | 314 |
| | Dimethyl sulfide (mg/L) | 303 | 75 |
| | Dimethyl disulfide (mg/L) | 162 | 29 |
| Co/Li/MgO | $COD_{Cr}$(mg/L) | 876 | 296 |
| | Dimethyl sulfide (mg/L) | 179 | 44 |
| | Dimethyl disulfide (mg/L) | 65 | 11 |
| Cr/MgO | $COD_{Cr}$(mg/L) | 475 | 149 |
| | Dimethyl sulfide (mg/L) | 88 | 26 |
| | Dimethyl disulfide (mg/L) | 61 | 17 |
| Fe/Li/MgO | $COD_{Cr}$(mg/L) | 3958 | 1622 |
| | Dimethyl sulfide (mg/L) | 987 | 286 |
| | Dimethyl disulfide (mg(L) | 883 | 158 |
| Ni/MgO | $COD_{Cr}$(mg/L) | 1201 | 564 |
| | Dimethyl sulfide (mg/L) | 469 | 154 |
| | Dimethyl disulfide (mg/L) | 377 | 86 |
| Pd/MgO | $COD_{Cr}$(mg/L) | 731 | 239 |
| | Dimethyl sulfide (mg/L) | 153 | 35 |
| | Dimethyl disulfide (mg/L) | 95 | 12 |
| $Fe/TiO_2$, | $COD_{Cr}$(mg/L) | 661 | 432 |
| | Dimethyl sulfide (mg/L) | 85 | 23 |
| | Dimethyl disulfide (mg/L) | 102 | 32 |

EXAMPLE 3
Treatment of Hydrogen Sulfide

A malodorous gas containing hydrogen sulfide at a concentration of 38, 28, 26 and 22 ppm was passed at a flow rate of 5.8, 7.8, 8.5 and 10 $m^3$/min., respectively, through a scrubber in which scrubbing water containing Fe/MgO catalyst prepared in Preparation 1 or 2 is placed (inner diameter of scrubber: 50 cm, height of scrubber: 80 cm, a packing material was packed in two stage and a demister was equipped). Subsequently, the resulting solution containing malodorous components was treated with oxygen at room temperature and 1 atm for 30 minutes in the presence of the Fe/MgO catalyst, as in Example 1.

The content of hydrogen sulfide was analyzed before and after the treatment by a gas chromatography and the removal efficiency of hydrogen sulfide in the malodorous gas are shown in FIG. 1.

Figure 2:
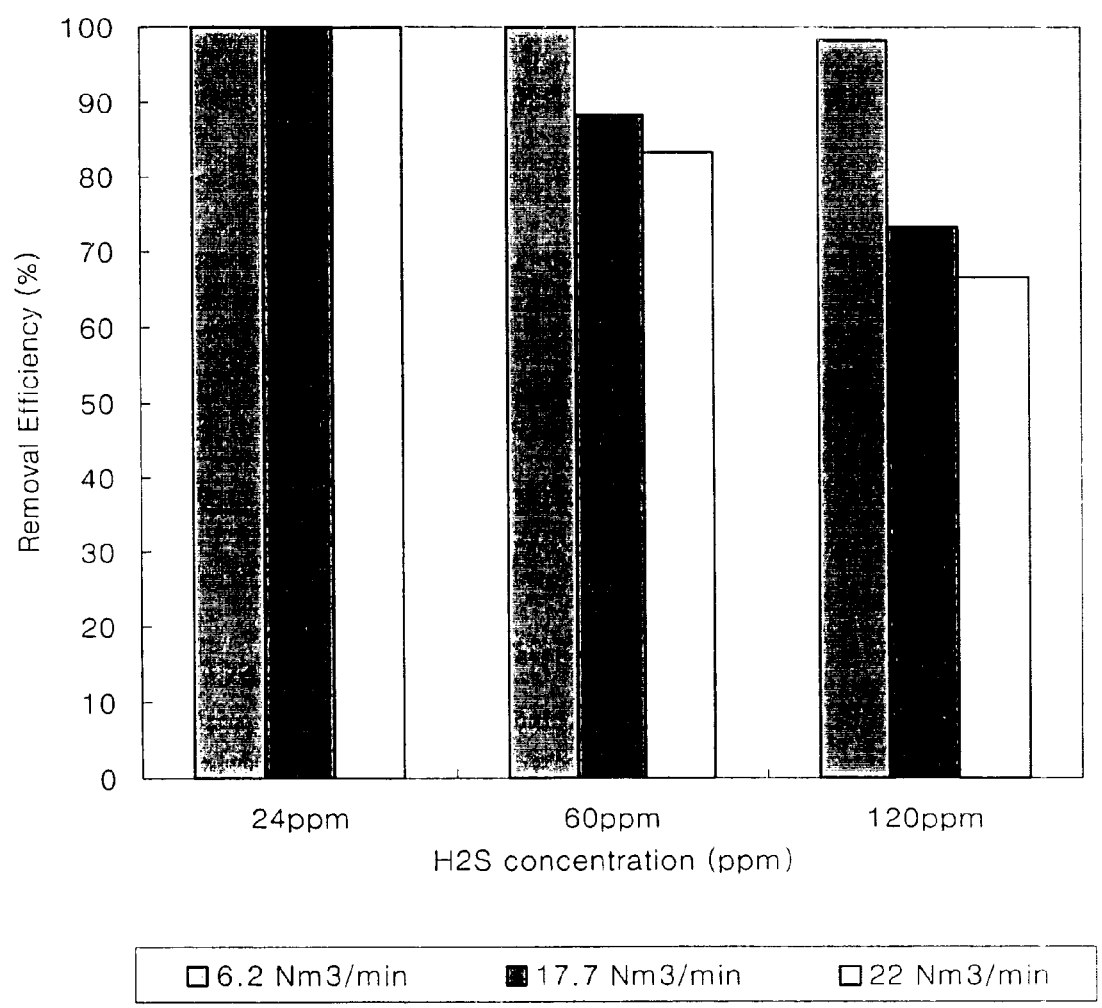

Further, the above procedure was repeated except that the flow rate was 6.2, 17.7 and 22 $m^3$/min. and the scrubber having a height of 200 cm and packed with Pall rings was employed, and the removal efficiency of hydrogen sulfide in the malodorous gas are shown in FIG. 2.

EXAMPLE 4
Treatment with Various Oxidizing Agents

The procedure of Example 1 was repeated using hydrogen peroxide, NaOCl and ozone as an oxidizing agent. Hydrogen peroxide and NaOCl were employed in an amount of 500 ppm and ozone was employed in an excessive amount.

The COD values and the contents of the sulfur compounds were measured before and after the treatment, and the results are shown in Table 3.

TABLE 3

| | Before the treatment | After Oxygen Treatment | After $H_2O_2$ Treatment | After $O_3$ Treatment | After NaOCl Treatment |
|---|---|---|---|---|---|
| $COD_{Cr}$ (mg/L) | 375 | 129 | 120 | 122 | 116 |
| Dimethyl sulfide (mg/L) | 130 | 39 | 35 | 13 | 15 |
| Dimethyl disulfide (mg/L) | 95 | 18 | 18 | 10 | 9 |

EXAMPLE 5
Effect of the Addition of $Br^-$

The procedure described in Example 1 was repeated except that ozone was employed as the oxidizing agent and 300 ppm of Br was added.

The COD values and the contents of the sulfur compounds were measured before and after the treatment, and the results are shown in Table 4.

TABLE 4

| | Before the treatment | After $O_3$ Treatment | After $O_3$ + $Br^-$ Treatment |
|---|---|---|---|
| $COD_{Cr}$(mg/L) | 532 | 186 | 156 |
| Dimethyl sulfide (mg/L) | 218 | 54 | 48 |
| Dimethyl disulfide (mg/L) | 136 | 20 | 15 |

EXAMPLE 6
Effect of the Addition of a Reducing Agent

The procedure described in Example 1 was repeated except that 5 mmol of ascorbic acid as a reducing agent was introduced.

The contents of the sulfur compounds were measured before and after the treatment, and the results are shown in Table 5.

TABLE 5

| Test item | Before the treatment | After Treatment |
| --- | --- | --- |
| Dimethyl sulfide (mg/L) | 500 | 103 |
| Dimethyl disulfide (mg/L) | 191 | 29 |

EXAMPLE 7

Treatment with Homogeneous Catalyst

The procedure described in Example 1 was repeated except that an aqueous $Fe(NO_3)_2$ solution was added to the cleaning water to a level of 1000 ppm Fe ions, and the pH of the cleaning.water was maintained at 4. In the catalytic oxidation, the wastewater stream was irradiated with a medium pressure mercury cathode ray tube.

The contents of the sulfur compounds of the wastewater were measured before and after the treatment, and the results are shown in Table 6.

TABLE 6

| Test item | Before the treatment | After Treatment |
| --- | --- | --- |
| Dimethyl sulfide (mg/L) | 210 | 41 |
| Dimethyl disulfide (mg/L) | 131 | 27 |

As clearly seen from above, in accordance with the present invention, various malodorous materials can be effectively treated by a catalytic absorption and oxidation in the presence of a specified catalyst under an ambient condition.

While the invention has been described in connection with the above specific embodiments, it should be recognized that various modifications and changes may be made to the invention by those skilled in the art without departing from the scope of the invention as defined by the appended claims.

What is claimed is:

1. A process for treating malodorous gases, which comprises: (a) bringing the malodorous gases into contact with a scrubbing water containing a heterogeneous catalyst to absorb the malodorous components catalytically, and (b) subjecting the resulting solution containing the malodorous components to a catalytic oxidation by contacting it with an oxidizing agent in the presence of the catalyst at a temperature ranging from 0 to 100° C. under an ambient pressure, the heterogeneous catalyst comprising an active metal element selected from the group consisting of alkali, alkaline earth and transition metals, and an oxide support material.

2. The process of claim 1, wherein the oxidizing agent is selected from the group consisting of air, hydrogen peroxide, ozone, oxygen, $N_xO_y$ (x=1~3, y=1~4), NaOCl and a combination thereof, with optional light irradiation.

3. The process of claim 1, wherein the support material is an oxide of an element selected from the group consisting of Al, Ga, In, Si, Ge, Sn, Pb, As, Sb, Bi, Se, Zn, Cd, Fe, Mn, Cr, Mo, W, V, Nb, Ti, Zr, Hf, Ta, Mg, Ca, Sr, Ba, Lanthanoid elements, Actinoid elements, or a mixture thereof.

4. The process of claim 3, wherein the support material is CaO, BaO, MnO, iron oxide, $TiO_2$, $SnO_2$, MgO, or $PbO_2$.

5. The process of claim 1, wherein the metal element is a transition metal.

6. The process of claim 1, wherein the catalyst further comprise a third element selected from the group consisting of an alkali metal and an alkaline earth metal, P, B, F, As, Ga, Ge and a mixture thereof.

7. The process of claim 1, wherein the catalytic system is irradiated with sun light or UV light.

8. The process of claim 1, wherein a complexing agent is additionally employed together with the catalyst.

9. The process of claim 8, wherein the complexing agent is ethylenediamine tetraacetic acid (EDTA).

10. The process of claim 1, wherein a reducing agent is additionally employed together with the catalyst.

11. The process of claim 10, wherein the reducing agent is selected from the group consisting of ascorbic acid, hydroquinone, formaline, methanol, trialkyl orthoesters, acetals and a mixture thereof.

12. The process of claim 1, wherein a radical transferring agent selected from the group consisting of $Br_2$, $Br^-$, $BrO^-$ and $BrO_3^-$ is further employed together with the catalyst.

* * * * *